(12) United States Patent
Van Ostrand et al.

(10) Patent No.: US 7,486,854 B2
(45) Date of Patent: Feb. 3, 2009

(54) OPTICAL MICROSTRUCTURES FOR LIGHT EXTRACTION AND CONTROL

(75) Inventors: Dan Van Ostrand, The Woodlands, TX (US); Carey King, Austin, TX (US); Garth Gobeli, Albuquerque, NM (US)

(73) Assignee: Uni-Pixel Displays, Inc., The Woodlands, TX (US)

(*) Notice: Subject to any disclaimer, the term of this patent is extended or adjusted under 35 U.S.C. 154(b) by 0 days.

(21) Appl. No.: 11/338,251

(22) Filed: Jan. 24, 2006

(65) Prior Publication Data
US 2007/0172171 A1 Jul. 26, 2007

(51) Int. Cl.
*G02B 6/26* (2006.01)
(52) U.S. Cl. .............................. 385/31; 385/39
(58) Field of Classification Search ................... 385/31, 385/39
See application file for complete search history.

(56) References Cited

U.S. PATENT DOCUMENTS

| | | | |
|---|---|---|---|
| 4,613,210 A | 9/1986 | Pollard | |
| 4,640,592 A | 2/1987 | Nishimura et al. | |
| 4,674,020 A | 6/1987 | Hill | |
| 4,685,766 A | 8/1987 | Nishimura et al. | |
| 4,699,511 A | 10/1987 | Seaver | |
| 5,009,483 A | 4/1991 | Rockwell, III | |
| 5,384,882 A | 1/1995 | Shimamune et al. | |

(Continued)

FOREIGN PATENT DOCUMENTS

| | | |
|---|---|---|
| EP | 0903720 | 3/1999 |
| JP | H10-078549 | 3/1998 |
| JP | WO 2006-016581 | * 2/2002 |
| JP | 2007-287176 | 11/2007 |
| WO | WO0163588 | 8/2001 |
| WO | WO03073405 | 4/2003 |

OTHER PUBLICATIONS

A. Nagasawa et al., "A Novel Backlight System with the Unified Component," IDW/AD '05, pp. 1285-1288.

(Continued)

*Primary Examiner*—Ellen Kim
(74) *Attorney, Agent, or Firm*—Fish & Richardson P.C.; Kelly K. Kordzik

(57) ABSTRACT

The application of microstructures which improve the quality of light available to the viewer of an optical display system, or any display which works on the concept of moving one surface into direct contact or close proximity of a light guide to extract light through frustrated total internal reflection. Optical microstructures are introduced on one or both of the surfaces of the active layer to enhance its performance. Since the active layer has both an input and an output function, means for enhancing both are presented. The input function to the active layer occurs on the internal surface, so this is where the present invention adds a collector-coupler, a means for facilitating the migration of light from the waveguide into the active layer. The output function occurs on the external surface, where the present invention adds a collimator, a means for both increasing the probability that a light wave will be released from the active layer, and improving the apparent intensity by redirecting light waves so that more of them reach the viewer. Compound microlenses on the internal surface of the active layer can serve as both collector-couplers and collimators, substantially improving light extraction from the light guide and light distribution to the viewer. Depositing a reflective or colored material in the interstitial spaces between these compound microlenses improves the contrast ratio and mitigate pixel cross-talk. The opaque material can be conductive for use in actuating the display.

30 Claims, 6 Drawing Sheets

U.S. PATENT DOCUMENTS

| | | |
|---|---|---|
| 5,396,350 A | 3/1995 | Beeson et al. |
| 5,428,468 A | 6/1995 | Zimmerman et al. |
| 5,440,388 A | 8/1995 | Erickson |
| 5,442,482 A | 8/1995 | Johnson et al. |
| 5,452,385 A | 9/1995 | Izumi et al. |
| 5,480,582 A | 1/1996 | Pope |
| 5,515,198 A | 5/1996 | Kusuda et al. |
| 5,587,816 A | 12/1996 | Gunjima et al. |
| 5,664,032 A | 9/1997 | Bischel et al. |
| 5,717,453 A | 2/1998 | Wohlstadter |
| 5,719,649 A | 2/1998 | Shono et al. |
| 5,748,825 A | 5/1998 | Rockwell, III |
| 5,751,383 A | 5/1998 | Yamanaka |
| 5,757,124 A | 5/1998 | Pope |
| 5,771,039 A | 6/1998 | Ditzik |
| 5,771,321 A | 6/1998 | Stern |
| 5,783,115 A | 7/1998 | Bilkadi et al. |
| 5,812,225 A | 9/1998 | de Lauzun et al. |
| 5,966,108 A | 10/1999 | Ditzik |
| 5,986,811 A | 11/1999 | Wohlstadter |
| 6,014,259 A | 1/2000 | Wohlstadter |
| 6,020,944 A | 2/2000 | Hoshi |
| 6,032,071 A | 2/2000 | Binder |
| 6,038,067 A | 3/2000 | George |
| 6,069,728 A | 5/2000 | Huignard et al. |
| 6,137,555 A | 10/2000 | Tamura et al. |
| 6,167,169 A | 12/2000 | Brinkman et al. |
| 6,195,143 B1 | 2/2001 | Ogawa |
| 6,195,196 B1 * | 2/2001 | Kimura et al. ............... 359/295 |
| 6,215,594 B1 | 4/2001 | Inoguchi et al. |
| 6,218,774 B1 | 4/2001 | Pope |
| 6,260,994 B1 | 7/2001 | Matsumoto et al. |
| 6,266,108 B1 | 7/2001 | Bao et al. |
| 6,278,500 B1 | 8/2001 | Ogawa et al. |
| RE037,377 E | 9/2001 | Gunjima et al. |
| 6,291,070 B1 | 9/2001 | Arpac et al. |
| 6,315,417 B1 | 11/2001 | Yajima et al. |
| 6,320,204 B1 | 11/2001 | Hirabayashi et al. |
| 6,324,009 B1 | 11/2001 | Conley |
| 6,327,071 B1 | 12/2001 | Kimura |
| 6,334,690 B1 | 1/2002 | Ohkawa |
| 6,381,381 B1 | 4/2002 | Takeda et al. |
| 6,403,395 B2 | 6/2002 | Hirabayashi et al. |
| 6,407,724 B2 | 6/2002 | Waldern et al. |
| 6,407,785 B1 | 6/2002 | Yamazaki |
| 6,418,267 B1 | 7/2002 | Lowry |
| 6,448,572 B1 | 9/2002 | Tennant et al. |
| 6,464,365 B1 | 10/2002 | Gunn et al. |
| 6,464,633 B1 | 10/2002 | Hosoda et al. |
| 6,469,755 B1 | 10/2002 | Adachi et al. |
| 6,470,115 B1 * | 10/2002 | Yonekubo ................... 385/32 |
| 6,507,379 B1 | 1/2003 | Yokoyama et al. |
| 6,512,560 B2 | 1/2003 | Ohtake et al. |
| 6,522,794 B1 | 2/2003 | Bischel et al. |
| 6,547,400 B1 | 4/2003 | Yokoyama |
| 6,559,909 B1 | 5/2003 | Kushida et al. |
| 6,591,037 B2 | 7/2003 | Yonekubo |
| 6,593,626 B2 | 7/2003 | Hirabayashi et al. |
| 6,594,064 B2 | 7/2003 | Hirabayashi |
| 6,600,528 B2 | 7/2003 | Colgan et al. |
| 6,618,106 B1 | 9/2003 | Gunn et al. |
| 6,618,200 B2 | 9/2003 | Shimizu et al. |
| 6,623,896 B1 | 9/2003 | Szajewski et al. |
| 6,636,310 B1 | 10/2003 | Ben-Dov et al. |
| 6,636,363 B2 | 10/2003 | Kaminsky et al. |
| RE038,305 E | 11/2003 | Gunjima et al. |
| 6,642,913 B1 | 11/2003 | Kimura et al. |
| 6,643,067 B2 | 11/2003 | Miyamae et al. |
| 6,645,603 B2 | 11/2003 | Koyama et al. |
| 6,649,312 B1 | 11/2003 | Chari et al. |
| 6,665,027 B1 | 12/2003 | Gunn et al. |
| 6,671,014 B2 | 12/2003 | Yokohama et al. |
| 6,680,010 B2 | 1/2004 | Sung et al. |
| 6,683,592 B1 | 1/2004 | Murade |
| 6,683,725 B2 | 1/2004 | Wohlstadter |
| 6,693,688 B1 | 2/2004 | Hisatake et al. |
| 6,700,634 B2 | 3/2004 | Taniguchi et al. |
| 6,724,973 B1 * | 4/2004 | Takeuchi et al. ............ 385/147 |
| 6,726,334 B2 | 4/2004 | Ishino |
| 6,747,785 B2 * | 6/2004 | Chen et al. ................... 359/291 |
| 6,760,135 B1 | 7/2004 | Payne et al. |
| 6,768,412 B2 * | 7/2004 | Becka et al. .................. 337/36 |
| 6,774,962 B2 | 8/2004 | Yoon |
| 6,783,244 B1 | 8/2004 | Okuyama et al. |
| 6,791,635 B1 | 9/2004 | Ohkawa et al. |
| 6,798,409 B2 | 9/2004 | Thomas et al. |
| 6,798,464 B2 | 9/2004 | Bietsch et al. |
| 6,805,448 B2 | 10/2004 | Yokoyama et al. |
| 6,814,442 B2 | 11/2004 | Okuyama et al. |
| 6,815,718 B1 | 11/2004 | Kawata |
| 6,825,889 B1 | 11/2004 | Saito et al. |
| 6,852,653 B2 | 2/2005 | Yamazaki et al. |
| 6,853,799 B2 | 2/2005 | Sung et al. |
| 6,856,712 B2 | 2/2005 | Fauver et al. |
| 6,867,821 B2 | 3/2005 | De Schipper |
| 6,900,858 B2 | 5/2005 | Yokoyama et al. |
| 6,900,941 B2 | 5/2005 | Kaminsky et al. |
| 6,909,555 B2 | 6/2005 | Wohlstadter |
| 6,923,760 B2 | 8/2005 | Koda et al. |
| 6,924,457 B2 | 8/2005 | Koyama et al. |
| 6,924,856 B2 | 8/2005 | Okumura et al. |
| 6,930,704 B1 | 8/2005 | Hamada |
| 6,930,735 B2 | 8/2005 | Ohkawa et al. |
| 6,940,138 B2 | 9/2005 | Yamazaki |
| 6,952,311 B2 | 10/2005 | Sakai |
| 6,959,130 B2 | 10/2005 | Fauver et al. |
| 6,961,045 B2 | 11/2005 | Tsao |
| 6,992,718 B1 | 1/2006 | Takahara |
| 6,999,071 B2 | 2/2006 | Balogh |
| 7,012,744 B2 | 3/2006 | Sakaguchi |
| 7,030,988 B2 | 4/2006 | Kubo et al. |
| 7,038,746 B2 | 5/2006 | Tominaga et al. |
| 7,044,608 B2 | 5/2006 | Okuyama et al. |
| 7,046,906 B1 * | 5/2006 | Cho ........................... 385/146 |
| 7,046,907 B2 * | 5/2006 | Miyashita ................... 385/146 |
| 7,050,219 B2 | 5/2006 | Kimura |
| 7,054,067 B2 | 5/2006 | Okano et al. |
| 7,058,252 B2 | 6/2006 | Woodgate et al. |
| 7,061,028 B2 | 6/2006 | Yaung et al. |
| 7,062,311 B1 | 6/2006 | Sendai et al. |
| 7,064,735 B2 | 6/2006 | Murade |
| 7,066,601 B2 | 6/2006 | Lee et al. |
| 7,068,878 B2 | 6/2006 | Crossman-Bosworth et al. |
| 7,071,594 B1 | 7/2006 | Yan et al. |
| 7,075,654 B2 | 7/2006 | Kubo et al. |
| 7,085,061 B2 | 8/2006 | Watanabe |
| 7,095,560 B2 | 8/2006 | Toyoda et al. |
| 7,106,517 B2 | 9/2006 | Olczak |
| 7,113,333 B2 | 9/2006 | Kamijima |
| 7,113,342 B2 | 9/2006 | Huang et al. |
| 7,123,311 B2 | 10/2006 | Yamakawa |
| 7,123,337 B2 | 10/2006 | Okumura et al. |
| 7,125,141 B2 | 10/2006 | Pao et al. |
| 7,125,505 B1 | 10/2006 | Dona et al. |
| 7,355,780 B2 * | 4/2008 | Chui et al. ................... 359/290 |
| 2002/0163728 A1 * | 11/2002 | Myers ........................ 359/613 |
| 2005/0185416 A1 | 8/2005 | Lee et al. |

OTHER PUBLICATIONS

PCT/US2007/060821 International Search Report and Written Opinion, PCT, Nov. 16, 2007.

* cited by examiner

800

801   802

900

901   902

1000

1001

OPTICAL MICROSTRUCTURES FOR LIGHT EXTRACTION AND CONTROL

TECHNICAL FIELD

The present invention primarily relates to the field of displays, and more generally to any display system in which light is extracted from a waveguide through means of selectively controllable contact with its surface.

BACKGROUND INFORMATION

The present invention addresses certain embodiments for improvement that occur when creating an optical display system, or any device which works on the concept of frustrated total internal reflection (FTIR), an example of which is the Time Multiplexed Optical Shutter (TMOS) display disclosed in U.S. Pat. No. 5,319,491, which is hereby incorporated by reference herein. Embodiments for improvement arise with respect to three basic optical materials in the design of a FTIR display. In a display application, there are defined locations within the architecture where a pixel nominally exists. Where this pixel exists, efficient light coupling from a light guide is desired when FTIR occurs (by controllable switching of the pixel to an "ON" state to frustrate the TIR condition). Where the pixel does not exist (e.g., inactive regions between pixels), very inefficient light coupling is desired. To allow light out of a pixel location when desired, an optical material is moved from a position that is very inefficient at FTIR, to one that is relatively much more efficient at FTIR. In the locations between all of the pixels, the material is inefficient at FTIR at all times.

Current approaches to addressing this situation involve three basic materials: (1) a total internal reflection (TIR) light guide, (2) a cladding material which has a lower refractive index than the light guide material, and (3) an optical coupling material that is the active layer. When no light is desired from a pixel (i.e., TIR is to be locally preserved), the optical coupling material is in a position, separated by cladding (which can be air), such that little to no light escapes the light guide since frustration of the TIR is not significant at this pixel location. When light is desired from a pixel (i.e., TIR is not to be locally preserved), the optical coupling material is moved toward the light guide (in which it may or may not come into contact with the light guide) such that the TIR condition is violated and light is released to a viewer due to physical geometry changes that result in FTIR at the pixel.

At a center of the implementation of TMOS lies a pixel wherein exists a means of extracting light from an underlying waveguide, generally through advantageous application of forces such that an external structure is caused to move into close proximity or direct contact with the underlying waveguide and light is extracted until the opposite, turning-off motion is generated. Embodiments for enhancing this process have been identified with regard to coupling light out of the underlying waveguide.

In particular, several improvement modes have been identified relative to a goal of maximizing the light that is apparent to the viewer. The first of these would be to more optimally capture light when the pixel is in "on" mode and any light that is reflected back into the light guide instead of entering the active layer as intended. Another improvement would be to more optimally capture any light that is reflected from the top surface of the active layer and returns to the light guide traveling the opposite direction across the cladding instead of exiting the active layer toward the viewer as intended. A means of more optimally transferring light waves into the active layer and then out toward the viewer would be advantageous.

Another improvement mode considers light within the active layer that is continuously reflected within it, with too shallow of an angle to be released to the viewer. These modes result in some light not reaching the viewer. A slightly different opportunity for improvement occurs when light leaves the external surface, but does so at an angle too shallow to be readily perceived by the viewer—though if it was released, it could more optimally benefit the viewer. A means of redirecting these shallow angle (surface-hugging) light waves more directly toward the viewer would be beneficial.

Another area of improvement for these types of devices, including TMOS, is to more controllably turn on, and then off, any given pixel within the color cycle, with any delays being predictable and short relative to one component color's cycle time. Previous embodiments have exhibited imperfect results in turning off the pixel controllably within such a time frame. In particular, occasionally pixels turned on would tend to stay on after the applied force to turn "on" was removed, a behavior known as stiction. It would be advantageous to more optimally control stiction when pixels are on when they should not be (in extreme cases of stiction). It would also be beneficial in shorter duration events that do not exceed the whole cycle's duration, but are on longer than intended within a cycle, the pixel's perceived color and/or brightness could be somewhat distorted if one of the component colors in the pixel does not turn off predictably as intended—where color is defined via pulse width modulation, stiction causes undesirable augmentation of pulse widths, thus distorting the color values being transduced. While not all FTIR architectures suffer from stiction, those that do would benefit from any improvement to restrict or eliminate its influence.

A related area of improvement involves pixel geometry where the cladding is separate from the active layer. When one pixel is turned "on" and then "off" again, the risk of unintended "crosstalk" is contemplated, wherein the active layer in an adjacent pixel is affected by the change in the adjacent pixel, to "on" or to "off" state, and the material moves relative to the underlying cladding, and thereby moves or creates a change in tension in the adjacent pixel's active layer. A means of reducing the risk of said "crosstalk" by stopping the relative motion between the cladding and the active layer would be beneficial.

SUMMARY

Embodiments for improvement outlined above may at least in part be addressed in some embodiments of the present invention by introducing microstructures on one or both of the surfaces where contact (or close proximity) occurs. A wide range of microstructure geometries are contemplated. These microstructures may consist of a semi-random distribution of peaks and valleys, characterized by varying degrees of "roughness." Or, a more controlled distribution of peaks and valleys of selected dimensions and densities, on one or both sides, may be employed. Under even more precisely controlled conditions, particular geometries, with tightly specified dimensions and distribution, may be employed.

The present invention enhances the light extraction process by introducing optical microstructures on one or both surfaces of the active layer. Since the active layer has both an input and an output function, means for enhancing both are envisioned. The input function to the active layer occurs on the internal surface, so this is where an embodiment of the present invention adds a collector-coupler, a means for facilitating migration of light from the waveguide into the active layer. An opaque material may be disposed interstitially between the collector-couplers to improve contrast. This opaque material can be electrically conductive which in turn can be used in actuating the pixel. The output function occurs on the external surface, so at this location an embodiment of the present invention adds a collimator, a means for both increasing the probability that a light wave will be released from the active layer, and improving the apparent intensity by redirecting light waves so that more of them reach the viewer. Issues such as stiction and pixel-to-pixel crosstalk are mitigated through advantageous selection of materials and geometries.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, detailed physical features are idealized in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 2:
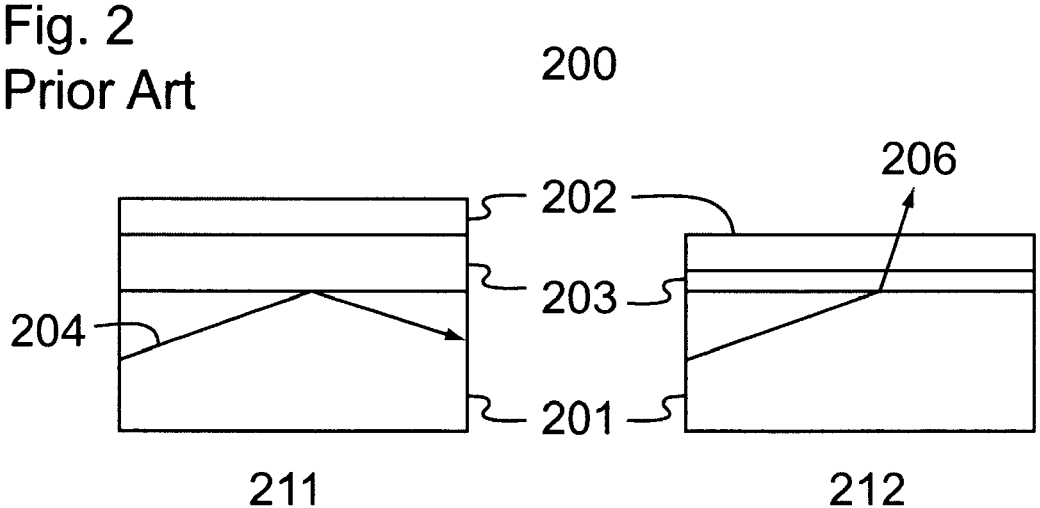
FIG. 2 illustrates a side view of the internal pixel geometry in a TMOS display, in "off" and "on" states.

The general concept of TMOS, as originally expressed in U.S. Pat. No. 5,319,491, is briefly illustrated in FIGS. 2 and 3. In FIG. 2, a side view 200 of one pixel 101 is shown, first in the "off" position 211, and second in the "on" position 212. An internal light guide 201, and the light waves 204 contained therein, are shown relative to the active layer 202, with "off" cladding 203 in the space between the two. As described previously, "off" 211 represents TIR and no light emission, and "on" 212 represents FTIR with light waves 206 released from the active layer 202. The mechanical change in position of the active layer 202 toward the light guide 201 causes the cladding thickness to decrease to "on" cladding 213.

Figure 3:
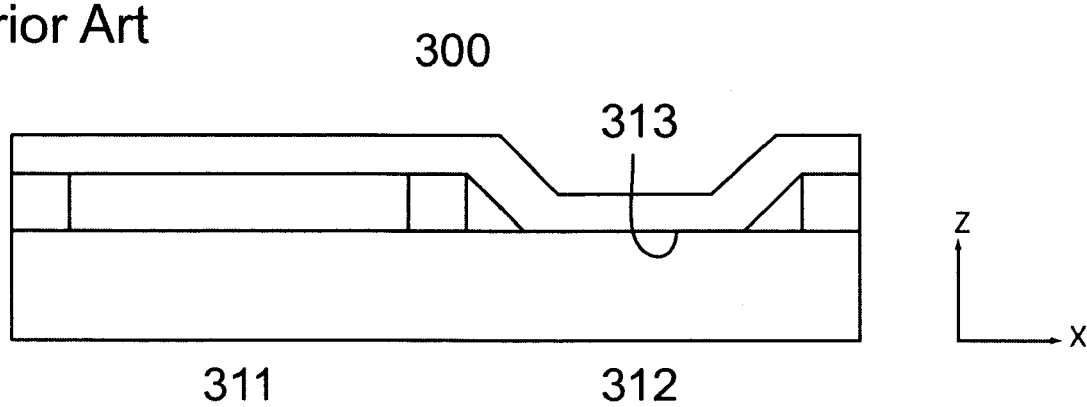
FIG. 3 illustrates a side view of two adjacent pixels in a TMOS display, one each in "off" and "on" states.

FIG. 3 shows a simplified side view representation 300 of two adjacent pixels, to more clearly contrast the "off" 311 geometry with the "on" 312 geometry. Of particular note is the special case for the "on" cladding 313 (corresponding to 213 in FIG. 2) shown here where contact takes place and therefore the cladding thickness 313 is zero. In this direct contact case, additional modes of coupling may become available and hence light coupling can be enhanced beyond the proximity case.

Figure 1:
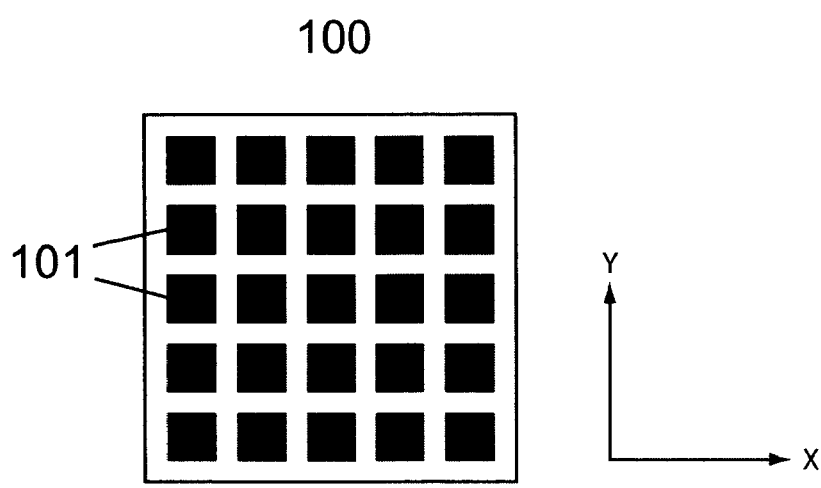
FIG. 1 illustrates an external view of a TMOS display, as seen by a viewer, to be used by any of several embodiments of the present invention.

FIG. 1 illustrates a TMOS display 100 configured to operate with pixels 101 described below in accordance with embodiments of the present invention. A top or plan view of display 100 is shown from a viewer's point of view. For simplicity, only a select number of pixels 101 are shown in a matrix format. Any number of pixels 101 may be implemented in accordance with principles of the present invention.

Figure 4:
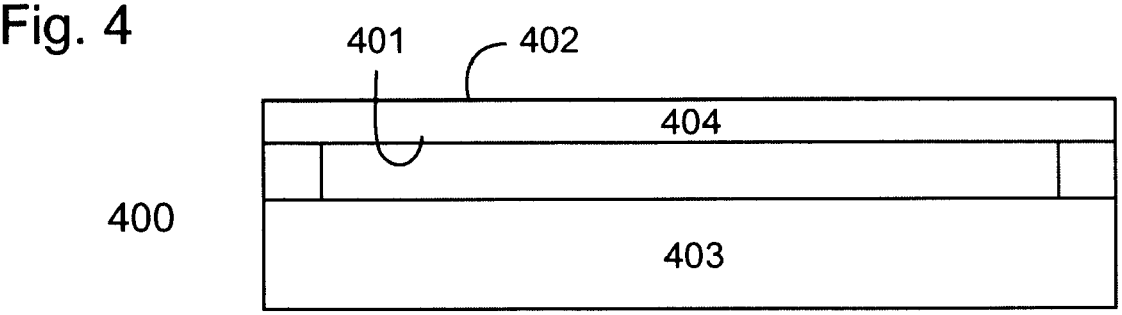
FIG. 4 illustrates a side view of one isolated pixel in a TMOS display, in "off" state.

FIGS. 4 through 7 show a more detailed side view of one pixel 101, to further illustrate embodiments of the present invention. FIG. 4 shows an isolated view 400 of a pixel 101, in the "off" geometry as in FIG. 3 "off" 311, with two particular surfaces of a light coupling layer 404 (similar to 202 in FIG. 2) identified—an internal surface 401 that faces a light guide 403 (similar to 201 in FIG. 2), and an external surface 402 that faces a viewer (not shown).

Figure 5:
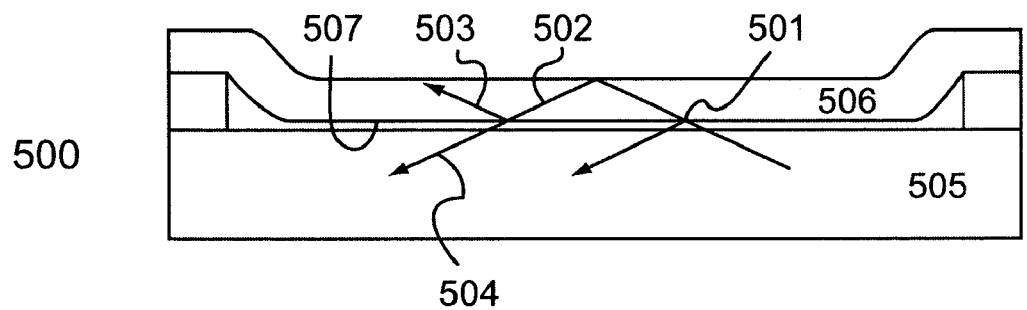
FIG. 5 illustrates a side view of one isolated pixel in a TMOS display, in "on" state with opportunities for enhanced light wave behavior shown.

In FIG. 5, a more detailed view 500 of pixel 101 is now shown in the "on" position. Three opportunities are illustrated with respect to optimizing the amount and direction of light that passes out of the active layer 506 (corresponding to 404 in FIG. 4), each can individually or in combination improve conditions so a viewer can more fully benefit from that available light. A first enhancement opportunity occurs at the interface between the active layer 506 and the light guide 505 (corresponding to 403 in FIG. 4), wherein even though the geometry is in the "on" position, light in the light guide is still reflected 501 from internal surface 507 (corresponding to 401 in FIG. 4) back into the light guide instead of entering the active layer 506 as intended. A second enhancement opportunity is similar in that a light wave 502 is reflected back into the light guide 505, but in this case, the outer surface 508 (corresponding to 402 in FIG. 4) is where non-beneficial reflection occurs, and light wave 502 is shown having re-entered the light guide 505 as 504. A third enhancement opportunity occurs when the light wave has entered the active layer with too shallow of an angle and is hence continuously reflected 503 within the active layer 506 without beneficially exiting.

Figure 6:
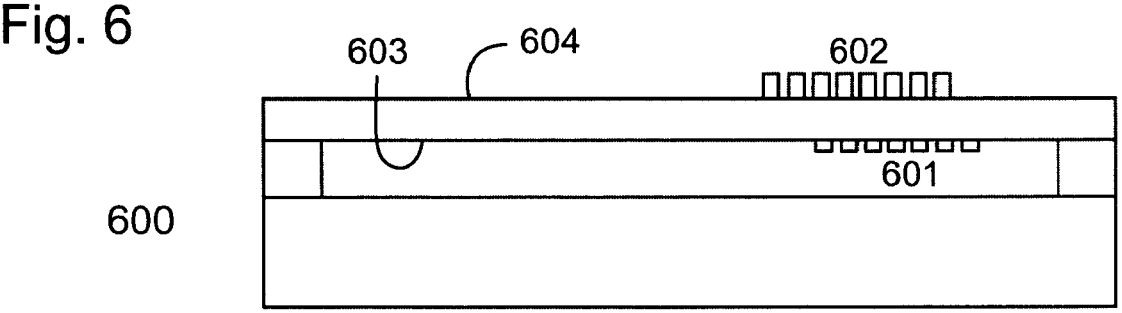
FIG. 6 illustrates a side view of one isolated pixel, in "off" state with beneficial features of the present invention shown.

Embodiments of the present invention are illustrated in FIG. 6, where the detailed model 400 has new features added in view 600. Collector-coupler features 601 are added to the internal surface 603 (corresponding to 401 in FIG. 4). The collector-coupler features interact with light waves that approach the vicinity of the light guide and "on" active layer interface, increasing the probability of light waves to exit the light guide and enter the active layer, to become available to the external surface 604 (corresponding to 402 in FIG. 4) of the active layer for release to the viewer. This release to the viewer may be further enhanced by another embodiment of the present invention. More particularly, on the external surface 604, collimator features 602 may be added. It is an object of said collimator features 602 to create benefits in two ways. A first of these is to interact with light waves as they approach the vicinity of the interface between the active layer's external surface 604 and the collimator features 602. Through said interaction, a probability of light waves to exit the external surface 604 and enter the collimator features 602 is increased, whereby the quantity of light waves that are available to be guided to the viewer is increased. A second benefit of the collimator features 602 relates to this guidance process once light waves have entered the collimator features 602. Optical properties of said structures 602 are advantageously chosen so as to redirect the light waves that would otherwise tend to leave the surface 604 at a shallow angle, nearly parallel to said surface 604, and instead cause them to leave the collimator feature's external surface more nearly in the direction of the viewer, which is more nearly perpendicular to surface 604.

One embodiment for fabricating collector-couplers 601, collimator features 602 and other similar features disclosed herein on the active layer involves processing of the unadjusted active layer using a roll-to-roll processing machine available from Nanoventions, Inc. (address: 1050 Northfield Court, Suite 280, Roswell, Ga., 30076). Using the Nanoventions roll-to-roll processes, which enable high-speed chemical lithography of acrylate nanofeatures on thin film polymer substrates, structures 601 and 602 may be fabricated on raw active layer polymer sheets that give rise to a desired performance hereunder, both with respect to optical output and mechanical integrity. Such structures may also be formed via roll-to-roll deployment using continuous deposition and monolithic integration, as implemented by Iowa Thin Films, Inc., while similar proven strategies for volume sheet polymer fabrication have enjoyed years of success with industry giants such as 3M, DuPont, and GE Plastics. Structures 601 and 602 may also be formed via negative mold topologies etched into a metal cylinder designed to impress the desired geometry into a suitably interactive polymer (e.g., a thermoplastic with sufficiently low viscoelastic behavior).

Figure 7:
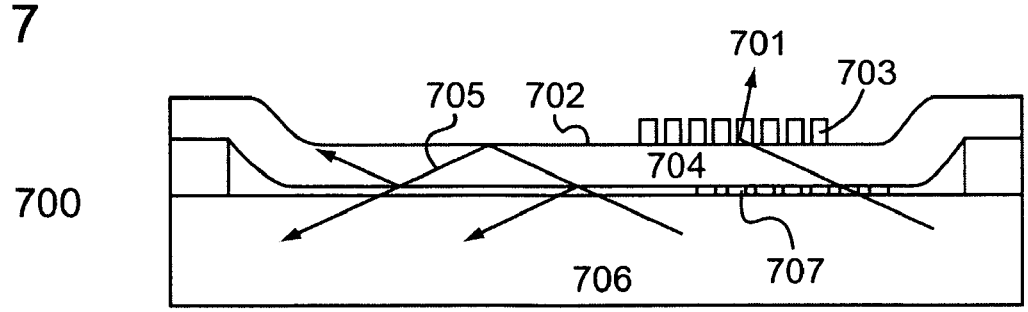
FIG. 7 illustrates a side view of one isolated pixel, in "on" state with beneficial features of the present invention, and corresponding beneficial behavior, shown.

FIG. 7 shows model 600 now in the "on" mode 700. In first illustrated embodiment, the collector-coupler features 707 (corresponding to 601 in FIG. 6), improve the probability of a light wave coupling into the active layer 704 and being transmitted to the viewer. Through advantageous selection of these geometries, mechanisms of enhanced coupling are implemented, including, but not limited to, antenna effects of interactions and optical amplifications through mutually reinforcing electromagnetic behaviors, whisper gallery mode resonance and reinforcement at desired wavelengths, complementary surface plasmon effects and associated reinforcing interactions with the previous resonances, and other beneficial mechanisms that will be apparent to one skilled in the art. These secondary effects arise due to geometry-enabled amplification not unlike the amplification effects attained by careful design of antennas, excepting that the wavelength range is that of visible light. In the case of surface plasmon resonances, the electromagnetic field traveling across the surface is in similar manner subject to amplification due to pseudo-antenna-like effects stemming from a strategically-chosen system geometry that is properly optimized.

Figure 14:
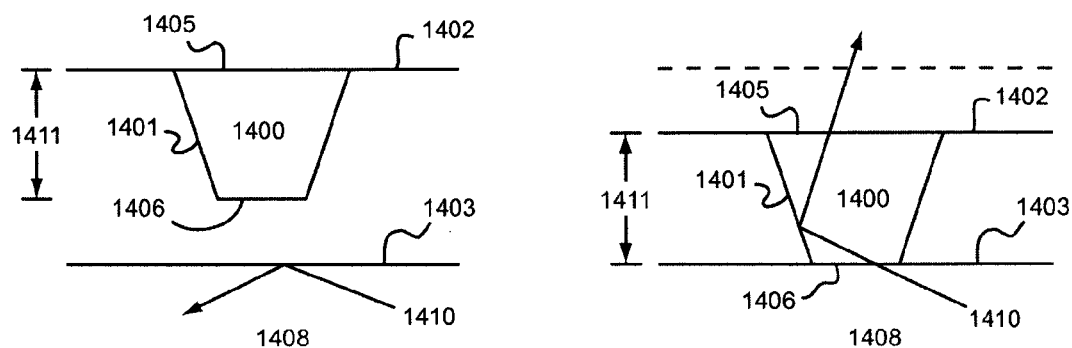
FIG. 14 illustrates a side view of one isolated microlens as used as a collector-coupler on the inside surface of the active layer of a pixel in the "off" state (left), and a side view of the same microlens with the pixel in an "on" state (right)

An example of said collector-coupler features is the compound microlens 1400 shown in FIG. 14. The shape of the microlens 1400 is designed so that light coupled into the aperture 1406 will contact a side 1401 under conditions sufficient for total internal reflection within the microlens 1400 before it contacts the internal surface of the active layer 1402. The light will then be reflected at an angle sufficient to cross the external surface of the active layer 604 and exit the display.

Figure 16:
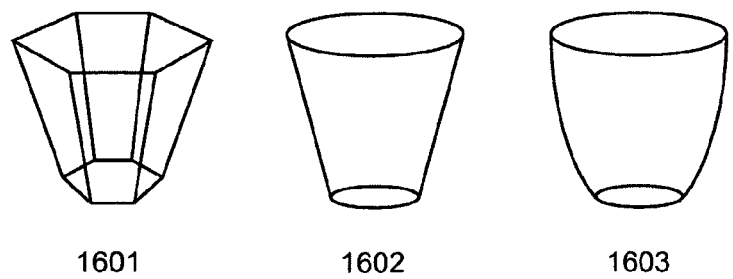
FIG. 16 illustrates several geometric shapes used for compound microlens.

FIG. 16 illustrates several exemplary shapes of the compound microlens 1400. The microlens 1400 can have any desired shape known to the art of non-imaging optics, such as pyramidal frustum 1601, conical frustum 1602, compound parabolic 1603, compound elliptical, polyobject or any conic section revolved to form a solid. A portion of the end of the microlens that faces the light guide surface 1403 is flat, giving the microlens the shape of a frustum. This flat surface area is the aperture 1406 through which light is coupled out of the light guide 1408 and into the microlens 1400. The relationship of the upper diameter 1405 of the microlens 1400 to the aperture diameter 1406 and the height 1411 of the microlens 1400, is determined by the refractive index of the light guide 1408 and the refractive index of the material comprising the microlens 1400. The refractive index of the light guide 1408 determines the critical angle for TIR light within the light guide 1408 (i.e., range of angles of available TIR light). When light is coupled from the light guide 1408 into the microlens 1400 it will change angle according to the refractive index of the microlens material. The angle of the side of the microlens 1401 is constructed such that the light coupled from the light guide 1408 remains TIR with respect to the sides 1401 of the microlens 1400. The height 1411 of the microlens 1400 is determined so that all or substantially all light that is coupled into the microlens 1400 strike a side 1401 of the microlens 1400 before it strikes the upper surface 1405. For example, a light guide 1408 of refractive index 1.52 and a microlens 1400 of refractive index 1.6 will require the diameter of the aperture 1406 to be approximately one-half the dimension of the upper diameter 1405 of the microlens. The height 1411 of the microlens 1400, in this example, would be approximately 60% of the upper diameter 1405. In this example, the microlens 1400 will redirect more than 96% of the light 1410 coupled into it across internal surface of the active layer 1402 and out the top surface of the active layer (to the viewer).

A benefit may also be realized from the addition of the collimator features 703 (corresponding to 602 in FIG. 6) at the external surface 702 (corresponding to 604 in FIG. 6). This benefit addresses the opportunity for enhancement 502 discussed previously. Through an advantageous selection of collimator features 703, the probability of the undesired reflection 705 (corresponding to 502 in FIG. 5) back into the light guide 706 is reduced, and more light passes out through surface 702.

A benefit may be realized with an addition of the collimator features 703—the features are chosen to advantageously redirect the released light wave 701 to a more desirable angle of emission, so that it is more available to the viewer. Released light waves at angles nearly parallel to the surface 702 are advantageously redirected to be more perpendicular to said surface 702, and thereby more apparent to a viewer. It should be noted that this improvement is in addition to the internal examples mentioned above.

The microlens 1400 in FIG. 14 can also function as a collimator. The shape of the microlens can be designed in a manner known to non-imaging optics so that light exits the active layer at desired angles, and not at angles nearly parallel to the external surface of the active layer 604 (FIG. 6).

Figure 8:
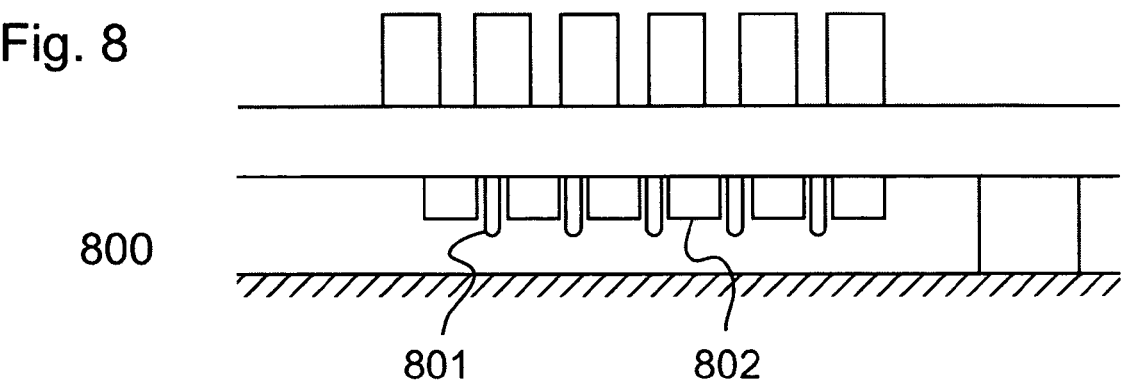
FIG. 8 illustrates a side view of one isolated pixel, in "off" state with additional bimodal collector-coupler beneficial features of the present invention shown.

FIG. 8 shows a magnified view 800 of "off" side view 600, including collector-coupler beneficial features 802 (corresponding to 601 in FIG. 6), and an additional set of features 801. By adding this second population of collector-coupler features 801, creating a bi-modal population, an additional benefit is attained that addresses the stiction issue mentioned in the Background Information. The simplified illustration shows a feature of this additional population 801, namely that it is longer than the other mode 802 in the overall population. When this surface 801 comes in contact with the light guide 806, the longer population 801 will contact first, and then be compressed as the surfaces 803, 807 move closer together, until the first population also reaches close proximity or direct contact. When the "off" mechanism is engaged and the surfaces 803, 807 are intended to separate, the compressed second population 801 acts as compressed springs, creating a brief but strong force to help initiate the separation movement. Said separating force is strongest at the very position when stiction is at its worst, the very start of separation. Of course, for purposes of this simplified illustration, two populations are described, but this should not be considered to limit the present invention, rather the present invention further envisions a plurality of varying populations, two or greater than two modes, with a range of heights to advantageously achieve said benefits with regard to overcoming stiction and also improving light coupling as previously described.

Figure 9:
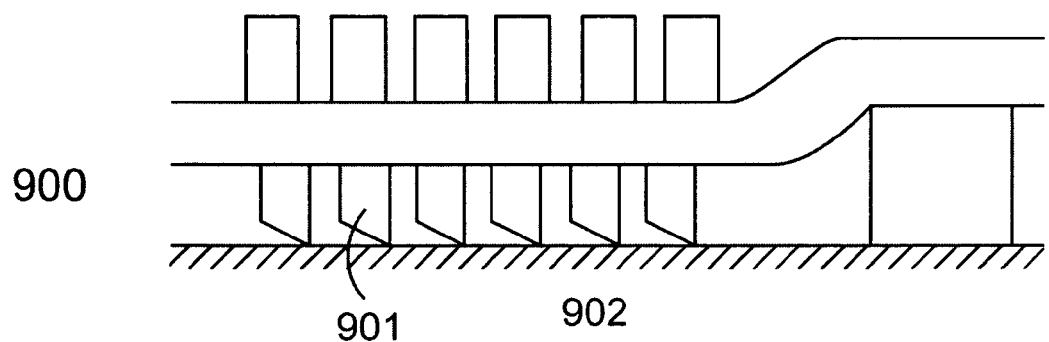
FIG. 9 illustrates a side view of one isolated pixel, in a nearly "on" state with additional flexurally biased spring-like collector-coupler beneficial features of the present invention shown.

FIG. 9 is a magnified view 900 of a side view of an embodiment of a pixel 101, nearly in the "on" position shown in 700, but shown in the position just prior to contact to more clearly illustrate details of the geometry, though it should be understood that they are simplified to help illustrate an embodiment the intention of the present invention. The angled features 901 are similar in optical behavior to the collector-coupler features 601, and derive similar benefits accordingly, but in this additional detail create a benefit. As the angled features 901 come into contact with the light guide 902, they are elastically deformed in such a manner as to build potential energy like a compressed spring (See FIG. 10). When the "on" period is over and the "off" mode initiates, these features 901 can advantageously release the potential energy in the form of an initial separation force, similar to the features 801 described above, that can beneficially increase the force available to overcome stiction.

Figure 10:
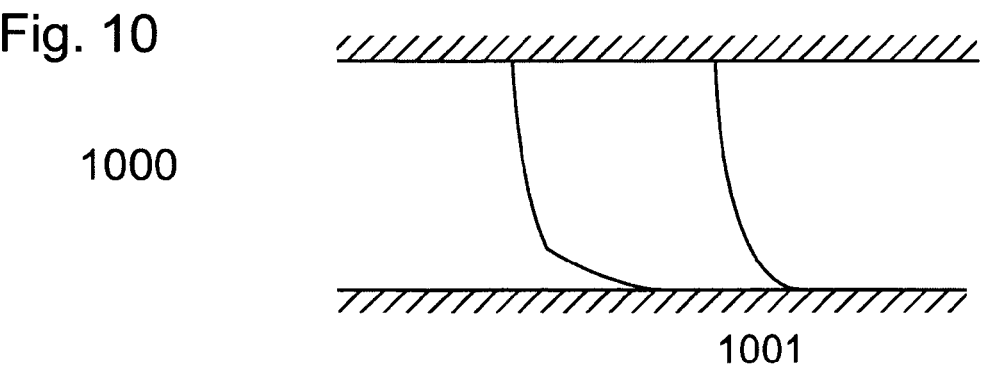
FIG. 10 illustrates a side view of one individual example of the flexurally biased collector-coupler features referenced in FIG. 9, here in a completely "on" state with maximum compression.

FIG. 10 illustrates a side view of one individual example 1000 of the flexurally biased collector-coupler features 901 referenced in FIG. 9, here in a completely "on" state with maximum compression 1001. The illustration is simplified and exaggerated to more clearly show an embodiment of the present invention. It should be appreciated that the illustrated compression is elastic in nature, and therefore will provide a force in the direction of separation, thereby beneficially increasing the overall force available to overcome stiction issues.

Figure 11:
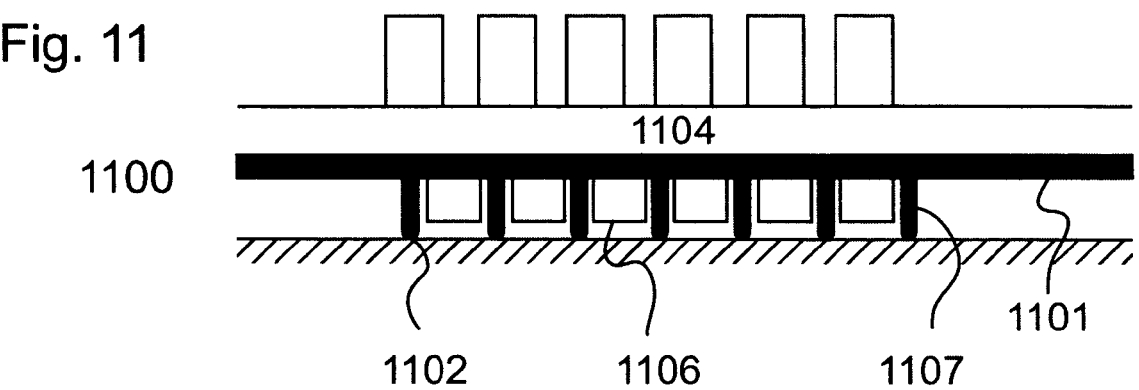
FIG. 11 illustrates a side view of one isolated pixel, in "off" state with additional bimodal collector-coupler beneficial features as shown in FIG. 8, here a second population of longer features serves as a distributed standoff and a layer of "springy" highly compliant materials is immediately under the surface features.

FIG. 11 illustrates a side view 1100 of an embodiment of one isolated pixel 101, in "off" state with additional bimodal collector-coupler features of the present invention as shown in FIG. 8, here the second population of longer features 1107 (corresponding to 801 in FIG. 8) serves as a distributed standoff with distributed points of contact 1102 and a layer of "springy" highly compliant material 1101 immediately under the surface features 1106 (corresponding to 802 in FIG. 8), and 1107. Several mechanisms are contemplated for overcoming stiction, including but not limited to: the active layer itself 1104 may have some compliance that could provide restorative force after "on" compression; likewise the longer standoff features 1107 are intended to be elastically compressed while "on" and also provide restorative force to overcome stiction; and the highly compliant layer 1101 is chosen to provide compliance and then a restorative force to overcome stiction.

Figure 12:
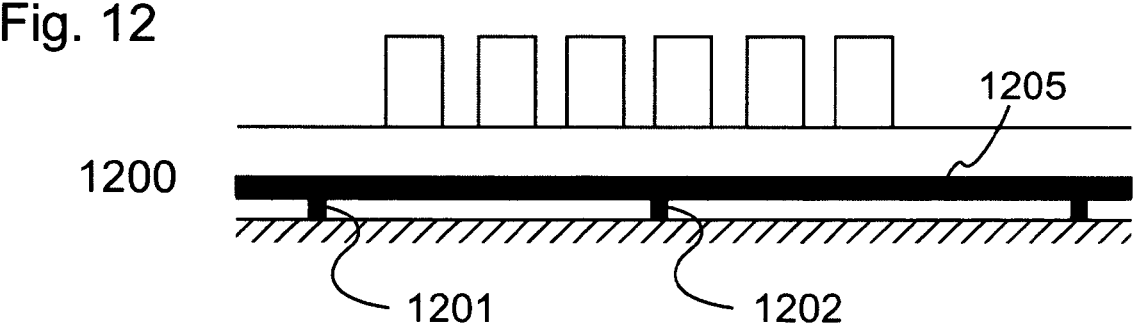
FIG. 12 illustrates a side view of one isolated pixel, in "off" state with additional beneficial features as shown in FIG. 8, here a population of standoff features is shown with a highly compliant supporting material that allows the standoffs to be sufficiently compressed so as to allow broad direct contact of the flat supporting material with the light guide.

FIG. 12 illustrates a side view 1200 of one isolated pixel 101, in "off" state with additional beneficial features of the present invention as shown in FIG. 8; here only a population of standoff features 1201 is shown with a highly compliant supporting material 1205 (similar to 1101) that allows the standoff's 1201 to be sufficiently compressed so as to allow broad direct contact of the flat supporting material 1205 with the light guide 1202. Said highly compliant material 1205 and the compressed standoff's 1202 could both provide restorative force to overcome stiction when "on" switches to "off."

It should be understood that not only is the geometry shown a simplification to illustrate the concept, but that it is possible to combine advantageously the different beneficial embodiments. For example, multi-modal population, as in 801 in FIG. 8 could also incorporate angled or other advantageously chosen geometries that create spring-like separation forces, within the non-longer population so as to overcome stiction through multiple means.

Figure 15:
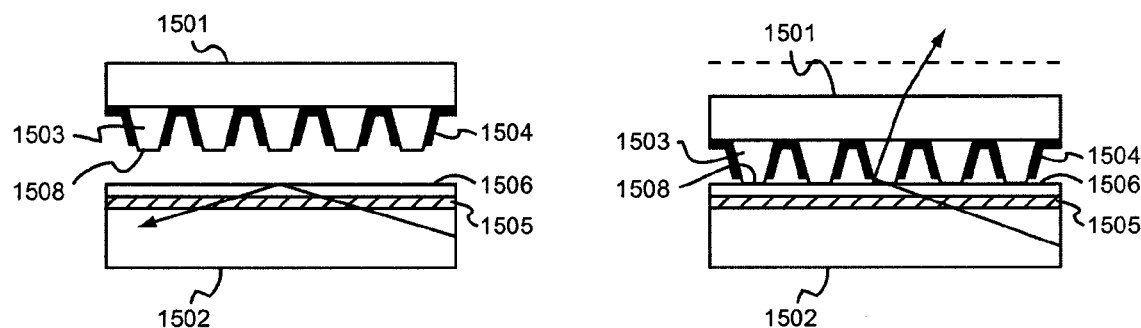
FIG. 15 illustrates a side view of a portion of one isolated pixel wherein the collector-coupler features are surrounded by an opaque material, which may be conductive. Both the "off" and "on" states of the pixel are shown.

An additional embodiment of the present invention is shown in FIG. 15. Since light is coupled out of the light guide by the collector-coupler features 1503, an opaque material 1504 can be disposed between the collector-coupler features 1503. The opaque material 1504 prevents light from entering the active layer at undesired locations, improving the overall contrast ratio of the display and mitigating pixel cross-talk. The opaque material 1504 can substantially fill the interstitial area between the collector-coupler features 1503 of each pixel, or it can comprise a conformal coating of these features and the interstitial spaces between them. The aperture 1508 (corresponding to 1406 of FIG. 14) of each collector-coupler 1503 remains uncoated so that light can be coupled into the collector-coupler 1503. Depending on the desired use of the display, the opaque material 1504 may be either a specific color (i.e., black) or reflective.

For electrostatically actuated pixels, such as those disclosed in U.S. Pat. No. 5,319,491, a deposition of opaque material 1504 which is conductive serves as one plate of a parallel plate capacitor. A layer of transparent conductor 1505, such as indium tin oxide (ITO) is disposed on the light guide, forming the other plate of the capacitor. By placing a voltage differential across these conductors, the flexible active layer 1501 is drawn toward the light guide 1502 by means of electrostatic attraction, thereby placing the pixel in the "ON" state. A layer of dielectric 1506 may be disposed on top of the transparent conductor 1505 to prevent short circuits between the two conductor layers. Deposition of conductor in this manner eliminates the need to deposit a layer of transparent conductor on the active layer (within the optical path of the viewer). This improves display efficiency while reducing the costs associated with transparent conductors relative to opaque conductors.

Figure 13:
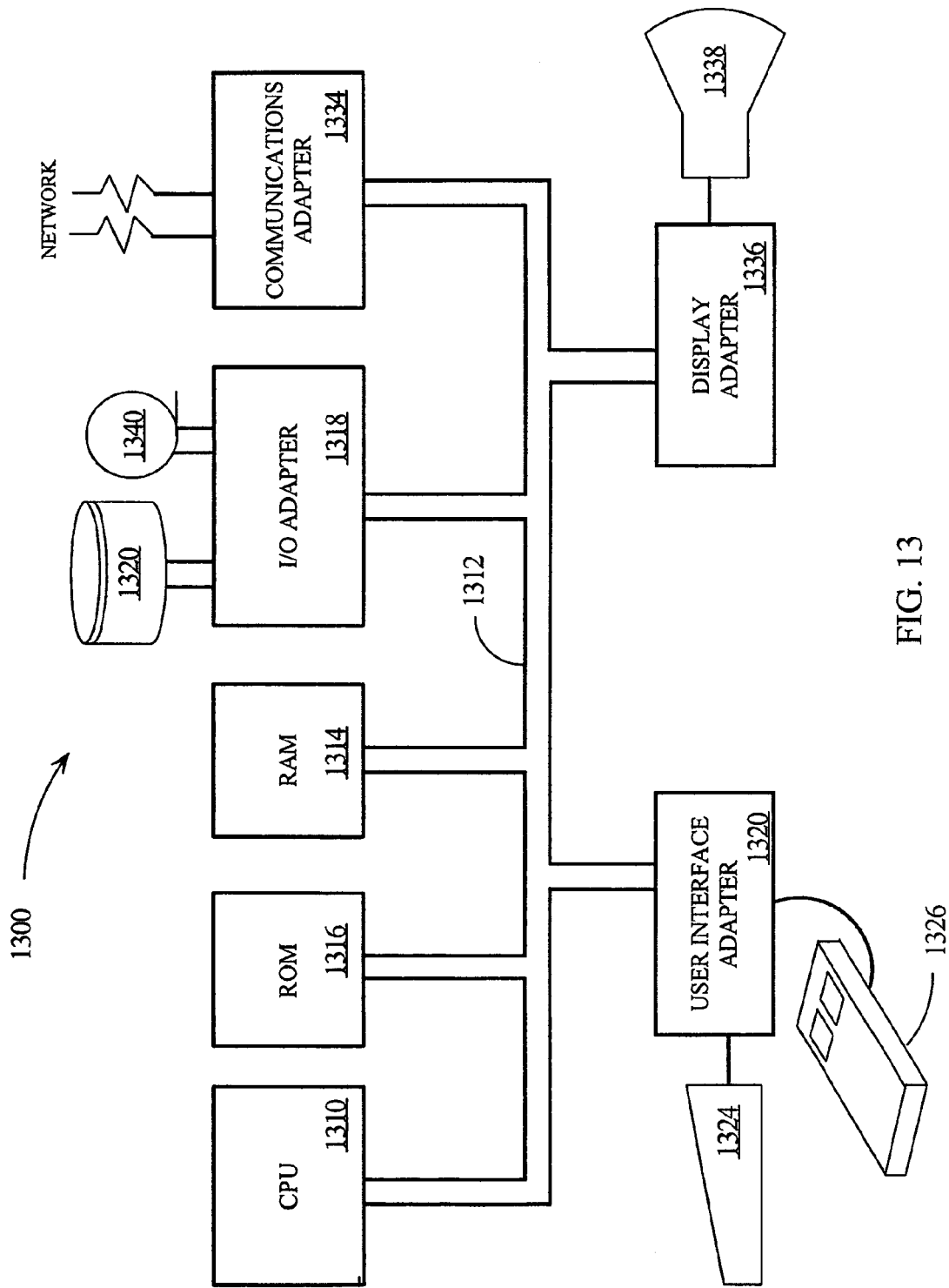
FIG. 13 illustrates a data processing system configured in accordance with an embodiment of the present invention.

A representative hardware environment for practicing the present invention is depicted in FIG. 13, which illustrates an exemplary hardware configuration of data processing system 1313 in accordance with the subject invention having central processing unit (CPU) 1310, such as a conventional microprocessor, and a number of other units interconnected via system bus 1312. Data processing system 1313 includes random access memory (RAM) 1314, read only memory (ROM) 1316, and input/output (I/O) adapter 1318 for connecting peripheral devices such as disk units 1320 and tape drives 1340 to bus 1312, user interface adapter 1322 for connecting keyboard 1324, mouse 1326, and/or other user interface devices such as a touch screen device (not shown) to bus 1312, communication adapter 1334 for connecting data processing system 1313 to a data processing network, and display adapter 1336 for connecting bus 1312 to display device 1338. CPU 1310 may include other circuitry not shown herein, which will include circuitry commonly found within a microprocessor, e.g., execution unit, bus interface unit, arithmetic logic unit, etc. CPU 1310 may also reside on a single integrated circuit.

Display device 1338 may incorporate display 100 and any of the various embodiments, or any other display technology capable of utilizing embodiments of the present invention. Control circuitry within display adapter 1336 is not disclosed herein for the sake of simplicity.

The invention claimed is:

1. A pixel, comprising:
   a light guide containing total internal reflected light waves; and
   an active layer having a first set of collector-coupler features on an internal surface of said active layer, wherein the active layer is configured to move said first set of collector-coupler features into close proximity to a surface of said light guide so as to cause light waves to exit the light guide and enter the first set of collector-coupler features, wherein a material is disposed interstitially between the collector-coupler features of said first set of collector-coupler features, and wherein said material is color absorbing or reflective.

2. The pixel as recited in claim 1, wherein said first set of collector-coupler features are angled or curved.

3. The pixel as recited in claim 1, wherein optical properties of each collector-coupler of said first set of collector-coupler features are selected such that light entering the collector-coupler from the light guide will contact a side boundary of the collector-coupler under conditions sufficient for total internal reflection within the collector-coupler before said light contacts a boundary between said collector-coupler and said active layer.

4. The pixel as recited in claim 1, wherein said material comprises an electrical conductor.

5. A display system, comprising:
   a plurality of pixels on a display, wherein each of said plurality of pixels comprises:
   a light guide; and
   an active layer having a first set of collector-coupler features on an internal surface of said active layer, wherein the active layer is configured to move said first set of collector-coupler features into close proximity to a surface of said light guide so as to cause light waves within the light guide to exit the light guide and enter the first set of collector-coupler features, wherein a material is disposed interstitially between the collector-coupler features of said first set of collector-coupler features, and wherein said material is opaque.

6. The display system as recited in claim 5, wherein said first set of collector-coupler features are angled or curved at their ends.

7. The display system as recited in claim 5, wherein said material comprises an electrical conductor.

8. The pixel as recited in claim 1, wherein the first set of collector-coupler features comprises a plurality of compound microlenses.

9. The pixel as recited in claim 8, wherein a shape of the compound microlens is configured so that light coupled into a first end of the compound microlens will contact an internal side of the compound microlens under conditions sufficient for total internal reflection within the compound microlens before it exits from a second end of the compound microlens that is parallel to and opposite of the first end of the compound microlens.

10. The pixel as recited in claim 8, wherein the compound microlens comprises a pyramidal frustrum.

11. The pixel as recited in claim 8, wherein the compound microlens comprises a conical frustrum.

12. The pixel as recited in claim 8, wherein the compound microlens comprises a compound parabolic.

13. The display system as recited in claim 5, wherein the first set of collector-coupler features comprises a plurality of compound microlenses.

14. The display system as recited in claim 13, wherein a shape of the compound microlens is configured so that light coupled into a first end of the compound microlens will contact an internal side of the compound microlens under conditions sufficient for total internal reflection within the compound microlens before it exits from a second end of the compound microlens that is parallel to and opposite of the first end of the compound microlens.

15. The display system as recited in claim 13, wherein the compound microlens comprises a pyramidal frustrum.

16. The display system as recited in claim 13, wherein the compound microlens comprises a conical frustrum.

17. The display system as recited in claim 13, wherein the compound microlens comprises a compound parabolic.

18. The display system as recited in claim 5, wherein the active layer is configured to physically move towards the light guide, when the pixel is activated to emit light, in a manner so that at least some of the first set of collector-coupler features contact the light guide.

19. The display system as recited in claim 18, wherein, when the pixel is inactivated to emit light, the active layer is positioned so that the first set of collector-coupler features are not in contact with the light guide.

20. The display system as recited in claim 5, wherein said material is color absorbing or reflective.

21. A display system, comprising:
   a plurality of pixels on a display, wherein each of said plurality of pixels comprises:
   a light guide; and
   an active layer having a first set of collector-coupler features on an internal surface of said active layer, wherein the active layer is configured to move said first set of collector-coupler features into close proximity to a surface of said light guide so as to cause light waves within the light guide to exit the light guide and enter the first set of collector-coupler features, wherein a material is disposed interstitially between the collector-coupler features of said first set of collector-coupler features, wherein said material comprises an electrical conductor.

22. A display system, comprising:
a plurality of pixels on a display, wherein each of said plurality of pixels comprises:
a light guide; and
an active layer having a first set of collector-coupler features on an internal surface of said active layer, wherein the active layer is configured to move said first set of collector-coupler features into close proximity to a surface of said light guide so as to cause light waves within the light guide to exit the light guide and enter the first set of collector-coupler features, wherein optical properties of each collector-coupler of said first set of collector-coupler features are selected such that light entering the collector-coupler from the light guide will contact a side boundary of the collector-coupler under conditions sufficient for total internal reflection within the collector-coupler before said light contacts a boundary between said collector-coupler and said active layer, wherein a material is disposed interstitially between the collector-coupler features of said first set of collector-coupler features, and wherein said material is color absorbing or reflective.

23. A pixel, comprising:
a light guide containing total internal reflected light waves; and
an active layer having a first set of collector-coupler features on an internal surface of said active layer, wherein the active layer is configured to move said first set of collector-coupler features into close proximity to a surface of said light guide so as to cause light waves to exit the light guide and enter the first set of collector-coupler features, wherein an opaque material is disposed interstitially between the collector-coupler features of said first set of collector-coupler features.

24. A pixel, comprising:
a light guide containing total internal reflected light waves; and
an active layer having a first set of collector-coupler features on an internal surface of said active layer, wherein the active layer is configured to move said first set of collector-coupler features into close proximity to a surface of said light guide so as to cause light waves to exit the light guide and enter the first set of collector-coupler features, wherein a material comprising an electrical conductor is disposed interstitially between the collector-coupler features of said first set of collector-coupler features.

25. A display system, comprising:
a plurality of pixels on a display, wherein each of said plurality of pixels comprises:
a light guide; and
an active layer having a first set of collector-coupler features on an internal surface of said active layer, wherein the active layer is configured to move said first set of collector-coupler features into close proximity to a surface of said light guide so as to cause light waves within the light guide to exit the light guide and enter the first set of collector-coupler features, wherein a material is disposed interstitially between the collector-coupler features of said first set of collector-coupler features, and wherein said material is color absorbing or reflective.

26. A pixel, comprising:
a light guide containing total internal reflected light waves; and
an active layer having a first set of collector-coupler features on an internal surface of said active layer, wherein the active layer is configured to move said first set of collector-coupler features into close proximity to a surface of said light guide so as to cause light waves to exit the light guide and enter the first set of collector-coupler features, wherein a color absorbing material is disposed interstitially between the collector-coupler features.

27. A pixel, comprising:
a light guide containing total internal reflected light waves; and
a positionable active layer having a first set of collector-coupler features on an internal surface of said active layer, wherein when the pixel is activated to emit light, the active layer is positioned such that said first set of collector-coupler features are in close proximity to a surface of said light guide so as to cause said light waves to exit the light guide and enter the first set of collector-coupler features, wherein an opaque material is disposed interstitially between the collector-coupler features of said first set of collector-coupler features.

28. The pixel as recited in claim 27, wherein said opaque material is electrically conductive.

29. The pixel as recited in claim 27, wherein said opaque material is color absorbing or reflective.

30. The pixel as recited in claim 27, wherein when the pixel is inactivated to emit light, the active layer is positioned so as to form a sufficient space between said first set of collector-coupler features and the surface of said light guide such that said light waves do not enter the first set of collector-coupler features at the pixel location.

* * * * *

UNITED STATES PATENT AND TRADEMARK OFFICE
CERTIFICATE OF CORRECTION

| | |
|---|---|
| PATENT NO. | : 7,486,854 B2 |
| APPLICATION NO. | : 11/338251 |
| DATED | : February 3, 2009 |
| INVENTOR(S) | : Daniel K. Van Ostrand |

Page 1 of 1

It is certified that error appears in the above-identified patent and that said Letters Patent is hereby corrected as shown below:

Title page, item [75], delete inventor's name "Gobell" and replace with --Gobeli--.

Signed and Sealed this

Twenty-first Day of April, 2009

JOHN DOLL
*Acting Director of the United States Patent and Trademark Office*